(12) United States Patent
Adolph

(10) Patent No.: US 9,372,271 B2
(45) Date of Patent: Jun. 21, 2016

(54) SYSTEM AND METHOD FOR GAIN REGULATION

(75) Inventor: Robert A. Adolph, Pennington, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 224 days.

(21) Appl. No.: 14/116,315

(22) PCT Filed: May 17, 2012

(86) PCT No.: PCT/US2012/038357
§ 371 (c)(1),
(2), (4) Date: Feb. 12, 2014

(87) PCT Pub. No.: WO2012/158922
PCT Pub. Date: Nov. 22, 2012

(65) Prior Publication Data
US 2014/0145072 A1    May 29, 2014

Related U.S. Application Data

(60) Provisional application No. 61/487,010, filed on May 17, 2011.

(51) Int. Cl.
*G01V 1/04* (2006.01)
*G01T 1/36* (2006.01)
*G01T 1/40* (2006.01)
*G01V 5/10* (2006.01)
*G01V 5/12* (2006.01)

(52) U.S. Cl.
CPC ............... *G01T 1/362* (2013.01); *G01T 1/366* (2013.01); *G01T 1/40* (2013.01); *G01V 5/101* (2013.01); *G01V 5/12* (2013.01)

(58) Field of Classification Search
CPC ............ G01V 5/04; G01V 5/06; G01V 5/101
See application file for complete search history.

(56) References Cited

U.S. PATENT DOCUMENTS

| | | | | | |
|---|---|---|---|---|---|
| 3,767,921 | A | * | 10/1973 | Jones | G01V 5/101 250/261 |
| 4,433,240 | A | | 2/1984 | Seeman | |
| 4,450,354 | A | * | 5/1984 | Smith, Jr. | G01V 5/06 250/256 |
| 4,525,273 | A | * | 6/1985 | Logsdon | E04D 13/0409 210/164 |
| 4,587,424 | A | * | 5/1986 | Grau | G01V 5/101 250/262 |
| 5,360,975 | A | * | 11/1994 | Stoller | G01V 5/04 250/261 |

(Continued)

FOREIGN PATENT DOCUMENTS

WO    2009127056 A1    10/2009
WO    2010053818 A2     5/2010

OTHER PUBLICATIONS

International Search Report for PCT Application Serial No. PCT/US2012/038357 dated Dec. 14, 2012.

*Primary Examiner* — Christine Sung
(74) *Attorney, Agent, or Firm* — Michael Dae

(57) ABSTRACT

Disclosed herein is a system for fast gain regulation in a gamma-ray spectroscopy instrument. The system includes a detector configured to generate a signal indicative of energy arriving at the detector, and a processor configured to determine one or more system performance indicators. The system also includes a controller configured to compute a first gain correction term based on one of more system performance indicators and change the device gain based on the computed first gain correction tem.

15 Claims, 5 Drawing Sheets

(56) References Cited

U.S. PATENT DOCUMENTS

| | | | |
|---|---|---|---|
| 5,422,480 A | 6/1995 | Schultz | |
| 6,318,463 B1* | 11/2001 | Fehrmann | E21B 47/10 166/250.03 |
| 2002/0038849 A1* | 4/2002 | Adolph | G01V 5/101 250/269.1 |
| 2004/0095102 A1* | 5/2004 | Koudelka | G05F 1/14 323/255 |
| 2004/0247080 A1* | 12/2004 | Feda | G01N 23/223 378/101 |
| 2005/0104002 A1 | 5/2005 | Shah | |
| 2006/0065824 A1* | 3/2006 | Mickael | E21B 47/0005 250/252.1 |
| 2010/0065723 A1* | 3/2010 | Burbar | G01T 1/1648 250/214 AG |
| 2010/0252726 A1 | 10/2010 | Inanc et al. | |
| 2011/0192979 A1* | 8/2011 | Cahill | G01T 1/40 250/362 |

\* cited by examiner

SDTCR = Total count rate (cps)
SDTCI = Total integrated charge (arbitrary charge units)
SDHVFD = Fast term for HV control (volts)
SDGRVZ = Slow term for HV control (volts)
SDGRGAI = Observed gain error (1.0 = no error)

SYSTEM AND METHOD FOR GAIN REGULATION

BACKGROUND

In nuclear measurements it is frequently helpful to determine the energy that a particle or photon has deposited in a detection device. These detection devices provide an electrical signal indicative of the amount of energy deposited in a single event. The energy distribution of these events, for example gamma rays from a multitude of elements, can be represented as a histogram, in which the abscissa represents the deposited energy or a function thereof, and the ordinate represents the number of events having a signal which falls into one of the discrete energy bins of the abscissa.

There are many variants of nuclear detectors. A nuclear detector typically includes the detecting material itself and devices to convert and/or amplify the signal. Such detectors can be semiconductor detectors such as Ge-detectors, scintillation detectors coupled to photon detectors, proportional counters, etc.

The purpose of a gamma ray spectroscopy system is to determine the energy associated with the absorption of incident gamma rays by the detector in what is referred to herein as pulse events. Pulse events can be registered in histograms organized by energy levels (Multi-Channel Analyzer, MCA spectra) and/or times of arrival (Multi-Channel Scaler, MCS spectra). The performance of such systems is measured in terms of energy resolution (i.e., ability to distinguish between separate but adjacent energy levels), time resolution (i.e., ability to distinguish between nearly coincident pulses), throughput (i.e., ability to process multiple adjacent pulses) and linearity (i.e., the linear relationship between deposited energy from a pulse and associated histogram channel).

Higher performance is achieved at higher count rates, or throughput, and higher energy resolution. Such systems can generally perform a specified measurement faster than slower systems and/or those with poorer resolution. This is due to both improved statistical uncertainties from the larger number of events counted and measured, and the ability to better separate energy peaks and features in the measured spectrum.

Referring to FIG. 1, a prior art gamma ray spectroscopy system 100 includes a scintillator detector 102 coupled to a photon-electron converter 104, a bias supply 106, pre-amplifier 108, shaping amplifiers 110, a pulse height/MCS analyzer 112, histogram acquisition memory 114, controller 116, user interface 118, network interface 120, and recording memory 122. These spectroscopy systems have applications in many industries and sciences. Some applications involve a stationary measurement in a lab, where a stable measurement can be performed under controlled conditions.

One particular application of interest is well logging. The detector moves through a subterranean borehole using various modes of conveyance to traverse rock formations of varying minerals, fluids, and structure. High performance systems can traverse the formations faster, achieving better statistical uncertainties and measurement quality than less performant systems. This is desirable for reducing the overall cost of measurement, especially if the measurement is performed in conditions where time in the borehole is costly, such as deep-water drilling rigs or high volume drilling operations. Related applications include fluid flow (pipeline) or material flow (conveyor) where the spectroscopy system may be stationary, but the material in the volume of investigation is continually changing due to material motion.

Methods to keep the histogram calibrated such that each bin is aligned with a specified energy range are known in the art as techniques for gain regulation. These methods usually adjust the gain of the acquisition system such that electrical signal amplitudes corresponding to each bin are properly aligned with gamma ray energies.

Accurate and stable gain regulation is critical for high performance spectroscopy systems, which typically have high count rate and high resolution specifications. However, in some applications such as well logging, the count rate is not only very high, but also highly variable. The energy distribution of the count rates may also vary as the measured volume around the detector changes. For a given bias supply setting, the energy calibration of the detector and associated devices may vary with count rate or energy distribution. This can be due to "loading" of the detection devices as the cumulative amount of charge changes, which may alter device characteristics such as gain. Or it could be due to signal processing effects in the system, which may vary with count rate or energy distribution.

If the system gain varies with count rate, then the acquired spectrum will be distorted. Often this will appear as if the energy resolution of the system is degraded. Small gain variations may impair statistical uncertainty during analysis of the spectrum, as peaks will be broadened. Larger gain variations may render the spectrum unusable, by creating multiple peaks or other distortions beyond the capability of typical spectroscopy processing algorithms. For high performance systems, it is critically important to prevent count rate induced variations from distorting the spectrum.

Gain regulation may operate by acquiring a spectrum for a long enough time to detect a spectral feature such as an energy peak or edge. Energy bins in the spectrum may have acquired enough counts that statistical uncertainty is small enough to compare bins and evaluate features. Techniques employed in the art include moments, peak detection, peak fitting, fitting of standards (unique spectral shapes for each element encountered), and so on. Some such methods may use considerable processing to be performed on the measured spectrum, which translates into additional delay before a correction can be applied to the system.

In most cases, the time spent to acquire a spectrum for gain analysis is longer than the time to perform individual measurements, and much longer than the time the logging equipment spends in the vicinity of a sample volume. For example, the logging device may move axially through the borehole at 1 foot per second. A typical volume of investigation spans approximately one foot or so axially. Spectra are acquired at perhaps 0.5 second intervals. Thus spectra may be changing significantly every 1 to 2 seconds as new volumes of rock are sampled.

However, some gain analysis techniques may use 5 to 10 seconds of data to achieve usable statistical precision. In some existing systems 60 seconds or more are used. Most closed loop control algorithms use several iterations to correct an error, so the response time of typical gain regulation algorithms is far too slow (20 seconds or more) to compensate for gain variations due to the rate (1 to 2 seconds) at which materials are measured. By the time a typical closed loop gain regulation algorithm has detected and compensated for a gain change, the condition stimulating the change may be long past.

The severity of the distortion to the measured spectra may depend on logging speed (rate of traversal), variations in successive formations, gain sensitivity of the spectroscopy system to count rate variation, energy resolution, and the speed of the control loops. High performance systems typically move faster through the formations, typically use very high count rates which may increase gain sensitivity to count rate variation, and have very fine energy resolution—which reduces the tolerance to gain variations.

Some regulation algorithms have been designed to accurately adjust the gain of the acquisition system over the long term, compensating for slow drift such as temperature changes. Such algorithms are, however, usually inadequate for short term gain changes, especially since a gain change may first be detected before it can be corrected. A method is needed to adjust the system gain in the short term (between the slower control updates from the traditional techniques), and make the appropriate changes to compensate for stimuli that affect the system gain without disrupting the slow, but accurate control provided by the traditional techniques.

SUMMARY

Disclosed herein is a system for fast gain regulation in a gamma-ray spectroscopy instrument. The system may include a detector configured to generate a signal indicative of energy arriving at the detector, and a processor configured to determine one or more system performance indicators. The system may also include a controller configured to compute a first gain correction term based on one of more system performance indicators and change the device gain based on the computed first gain correction term.

Also disclosed herein is a method for fast gain regulation. The method may include applying a voltage to a detector of a spectrum acquisition tool, and acquiring an energy spectrum with the spectrum acquisition tool. The method may further include during a first time period, detecting one or more system performance indicators and adjusting the voltage by a first amount relating to the one or more system performance indicators. The method may also include during a second time period, detecting a gain error based on the energy spectrum acquired and adjusting the voltage by a second amount relating to the gain error. The first time period may be shorter than the second time period, and the second time period may comprise the time to acquire the energy spectrum with predetermined statistical precision.

DETAILED DESCRIPTION

Figure 1:
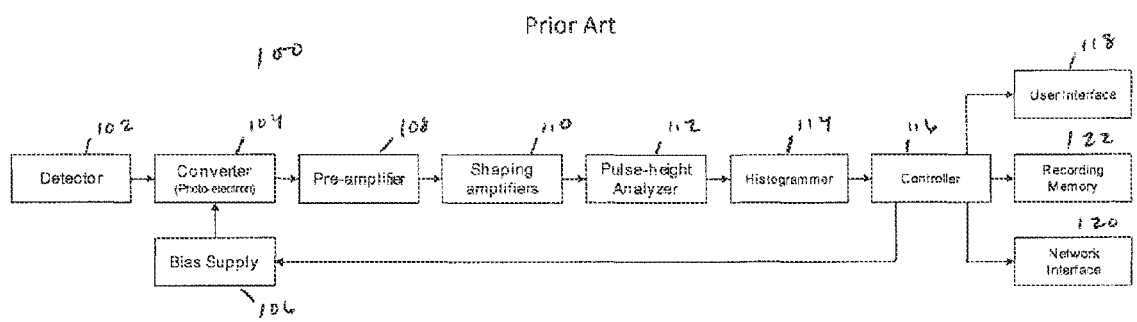
FIG. 1 shows a block diagram for a prior gamma-ray spectroscopy acquisition system.

In the following description, numerous details are set forth to provide an understanding of the present disclosure. However, it will be understood by those skilled in the art that the following may be practiced without these details and that numerous variations or modifications from the described embodiments are possible.

A method is presented here which addresses the issue of gain regulation being too long term by using information gathered at faster rates to determine an additional correction term which can be combined with the slower correction from a prior art closed loop technique. The method presented by this disclosure uses an open loop approach which does not rely on real-time analysis of gain change.

The method of the present disclosure is built around a traditional gain regulation approach in which a spectrum is acquired until sufficient statistical precision is reached, then the energy calibration of the spectrum is analyzed to determine gain error of the system, and a correction (typically bias voltage adjustment) is applied to the system. The control loop repeats indefinitely to maintain the energy calibration of the spectroscopy system.

The method adds a faster or more responsive gain regulation by measuring at a faster rate a term that may influence system gain. Such terms may include total count rate, peak count rate, total detector current, or other "system performance indicators" from the spectroscopy system. These indicators can be sampled at much higher rates with much better precision than individual energy bins in a spectrum, since they are based on a larger number of events—often the totality of the spectrum. The selection of such terms will depend on the system, especially the detector.

The relationship between the "system performance indicator" term (e.g. total count rate) and relative corrections (e.g. bias voltage change) can be determined in advance by experiment for the system design or for individual systems. Because this is an incremental correction, accuracy is not as critical as for the slower closed loop system. The indicator is measured, that value is transformed to a relative correction (typically small), and the correction is added to the closed loop setting (e.g. bias voltage) during the faster open loop cycle. In each successive open loop cycle, a new relative correction is computed and applied in place of the prior open loop correction. The result is a slow loop to maintain closed loop accuracy and a fast loop to provide empirical open loop corrections to fast changing conditions.

Gain regulation is critical for spectroscopy systems, especially in well logging. For the many modes of conveyance available—wireline, logging while drilling, logging while tripping, casing drilling, slick line, drill-pipe conveyed, tubing conveyed, free-fall, or any other mode, spectroscopy logging usually acquires spectral data in time increments which are then aligned to depth. If the energy calibrations of the merged spectra are not the same, then spectral quality will be degraded, as will subsequent spectroscopy processing. Further degradation may occur when the data from multiple depths are combined during stacking or filtering calculations. Typical effects are reduced resolution and increased statistical uncertainties of results, or worse.

One potential approach may employ significant pre-processing of each time-based spectrum, but gain (and offset and linearity) corrections on spectra with low total counts increase risk of bad fits and spurious errors. Such pre-processing uses significant computing power and development effort. An alternate potential solution is to post-process the depth-based spectra before filtering in hopes of minimizing degradation, but the time-based merge already includes distortions, especially for larger time intervals.

An optimal approach is to maintain the energy calibration of the spectroscopy acquisition system such that all spectra are acquired with the same energy calibration. This can be achieved by combining traditional closed-loop gain regulation techniques to provide long term accuracy (such as thermal drift) with fast techniques, such as open-loop, to compensate for other error sources such as varying count rate. The compensation may occur in real-time, without observable delay. Such a system is described here.

Figure 2:
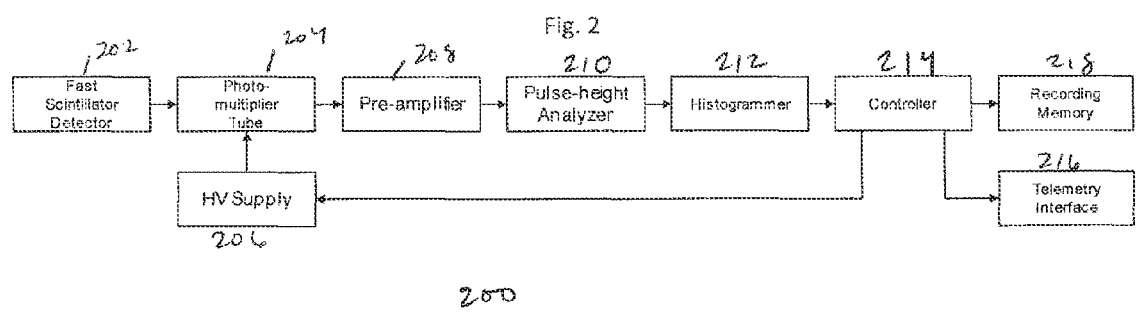
FIG. 2 shows a block diagram for an illustrative spectroscopy system in accordance with one embodiment of the present disclosure.

The goal is to keep all spectra acquired from the system 200 shown in FIG. 2 within gain regulation specifications. The system 200 includes a fast scintillator 202 (such as a LaBr3: Ce crystal) detecting gamma rays and emitting photons. The scintillator 202 is coupled to a photo-multiplier tube 204 (PMT) converting photons to electrons. A bias supply 206 coupled to the PMT 204 (i.e., a controllable high voltage supply) and a pre-amplifier 208 sensing the current from the PMT 204. A pulse-height analyzer 210 (PHA), or processor, uses analog and digital electronics to convert the pre-amplifier signal into digital data indicative of the height or integral of the detected gamma-ray signal. The system 200 also includes a histogrammer 212 to count the number of gamma-ray events in each energy bin in spectra and a controller 214 to manage the system 200, communicate data and commands, and execute control algorithms. The system 200 also includes an optional telemetry channel 216 for communication to another computer, and a recording or memory device 218 for storing acquired data.

The system 200 is designed to acquire data fast enough to traverse subterranean formations at 1 foot per second, and to produce spectra every 0.5 feet, thus every 0.5 seconds.

Traditional gain regulation is implemented by running an algorithm on the controller (or in electronics) that acquires spectra and analyzes the spectra to determine gain or gain error. (e.g. determining whether a gamma-ray peak in the correct bin, and if not, how far from the correct bin has the peak deviated?) The resulting error is used to adjust the bias supply (high voltage or HV) to the PMT 204. Depending on the spectral calculation being performed, this process repeats every 3 to 10 seconds or more—much slower than the rate at which formations are being traversed. A faster method is needed to handle gain variation between updates from the traditional gain regulation algorithm.

Increasing the HV increases the PMT gain, and hence the energy calibration of the entire system, and vice versa. Because of the multi-stage design of PMTs, over a limited voltage range, gain g typically follows a power law $g=c \cdot V^n$, where n is related to the number of PMT gain stages (dynodes), and can easily reach electron gains of $10^4$ or higher.

PMT gain is known to vary not only with HV, but also with temperature, count rate, average anode current, etc. Temperature drift is readily handled by traditional gain regulation techniques and HV is under control of the gain regulation algorithm. However, count rate variations pose considerable challenges for a high performance spectroscopy system. Count rate may vary due to source intensity changes (especially with neutron generators) or changing environment around the detector as found in well logging. Effects such as this have been observed in many spectroscopy systems.

In one experiment, with count rates varying +/−2%, PMT gain was observed to change +/−2%. This resulted in notable distortions in calculations of the acquired spectra requiring non-standard expert re-processing to correct the distortions.

For higher performance spectroscopy systems, gain accuracy is even more important due to improved resolution. Stability of gain is more important due to higher count rates (to achieve better statistical precision), faster logging speeds giving faster changes to count rates, faster logging speed requiring shorter acquisition times for spectra, and use of neutron generators adding more potential for count rate changes. This makes compensation for count-rate induced gain changes necessary.

Various theories have been put forth to explain the effect, and each may have merit. Theories include space charge effects, charge layers on PMT dynodes, voltage redistribution among dynodes, and so on. It may not be clear which modes are in effect for a given system, but these explanations do share one common aspect—more events are measured and more charge is passing through the PMT 204 for a given time interval. This puts more load or stress on the PMT 204 and its bias supply 206, and appears to result in the observed gain shifts.

Slow gain regulation is implemented by executing an algorithm on the controller 214 that acquires spectra and analyzes the spectra to determine gain or gain error. For example, the controller 214 is configured to calculate if a gamma-ray peak is in the correct bin, and if not, how far from the correct bin is the deviation. The resulting error is used to adjust the bias supply 206 (high voltage, HV) to the PMT 204. Depending on the spectral calculation being performed, this process repeats every 3 to 10 seconds—at a much slower than the rate at which formations are being traversed. Effective loop gain is typically less than one, thus several cycles of the control loop are used to null the error. An additional more rapidly responding method is needed to handle gain variation between updates from the slow gain regulation algorithm.

Consideration of PMT loading led to the one aspect of the present disclosure—to modify the HV applied to the PMT 204 in anticipation of the gain change that may occur. The anticipated gain change can be inferred by examining in real-time the load on the PMT 204. In one embodiment, the loading is represented by the observed total count rate (TCR). In another embodiment, the load on the PMT 204 is the amount of charge produced (at the PMT anode) in a given time interval, i.e. the anode current. Anode current is a reasonable driver of the gain distortion as it is proportional both to the number of events and to the average amplitude (energy) of the events, and represents gross charge behavior inside the PMT 204. This is analogous to the integral of the spectrum.

Digital pulse height analyzers (PHA) implemented in digital electronics, such as processors, readily support real-time generation of computed terms such as total count rate (TCR) and total integrated charge (TCI). In the system 200, these terms are produced at 125 ms intervals. TCR reports the total counts during each interval, and is subject to pile-up effects, especially at higher count rates. TCI is slightly more complex, but more robust. TCI is computed by summing all observed current from the PMT 204 anode for all events, including pile-ups. Any DC (baseline) current from the PMT 204 is excluded from TCI, as this does not reflect gamma-ray events. Because TCI is acquired over fixed intervals, it can be viewed as either charge or current (charge per time interval).

The preferred embodiment employs TCI, which represents the current load on the PMT 204, to measure in real-time the stimuli on the PMT 204 inducing gain variation. This measurement is then used to estimate the amount of HV change to compensate for the anticipated gain variation. The TCI measurement, computation, and HV change are performed every 125 ms, much faster than the rate at which formations are traversed (and accordingly, faster than the rate at which acquisition measurements are performed).

Figure 3:
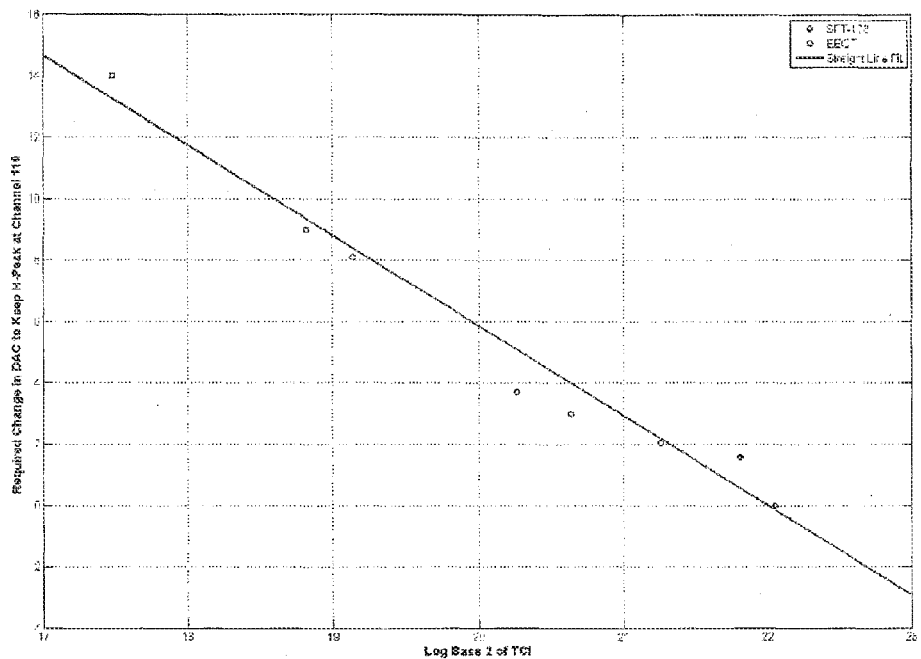
FIG. 3 shows a graph of experimental results for high voltage change used to correct for gain errors induced by changes in total integrated charge, plotted versus total integrated charge, in a system such as that shown in FIG. 2.

Early experiments on several models of PMTs indicated a possible logarithmic effect—to correct the gain error induced by a count rate change uses an incremental change in HV related to the log of count rate. More detailed experiments on a selected PMT model were performed to explore the relationship between TCI and HV adjustments. These are shown in FIG. 3, where the change in HV in volts is plotted vs $\ln_2(TCI)$, where TCI is in arbitrary units of charge per time interval. Note that PMT HV is approximately 1200V for these experiments, so the entire y-axis range is less than 2% of the nominal HV. In any embodiment, the relationship between a given system performance indicator (such as TCI) and a gain adjustment (such as HV) can be mapped and determined experimentally, such that once the tool is in use, the gain adjustment for a given load can be looked up.

The points labeled "SFT-178" are measured in a test tank (water-filled) at varying source strength. The points labeled "EECF" are measured in a porous rock formation at varying source strength. The two series are normalized at $\ln_2(TCI)$ =22. A straight-line fit reasonably approximates the data, with some fitting error explained by continuing PMT thermal drift during the experiments.

The slope here of approximately −2.9V per doubling of TCI represents the empirical characteristic for the particular PMT unit used in this experiment. (2.9V is equivalent to approximately 1.5% gain change in this case.) Other PMT units may use a slightly different slope. This can be easily calibrated at time of manufacture for a particular instance of a spectroscopy system by measuring two points—one at nominal source output and one at say 2% source output. Early data show little difference in slope between different units in the same model series. It is also possible to dynamically calibrate the slope during well logging by adjusting the slope until overall gain regulation shows the least sensitivity to TCI (or TCR) changes.

Note that other PMT models may use a much different slope. PMTs with significant design and/or processing changes, or with very different bias supply structures, may use a different functional form from that shown here. For some systems, the relationship may be better represented by percent change of HV, instead of a direct voltage change. This can be useful if each PMT has a very different operating HV. The experiments and technique for deriving the form, and for calibrating individual units are similar.

Figure 4:
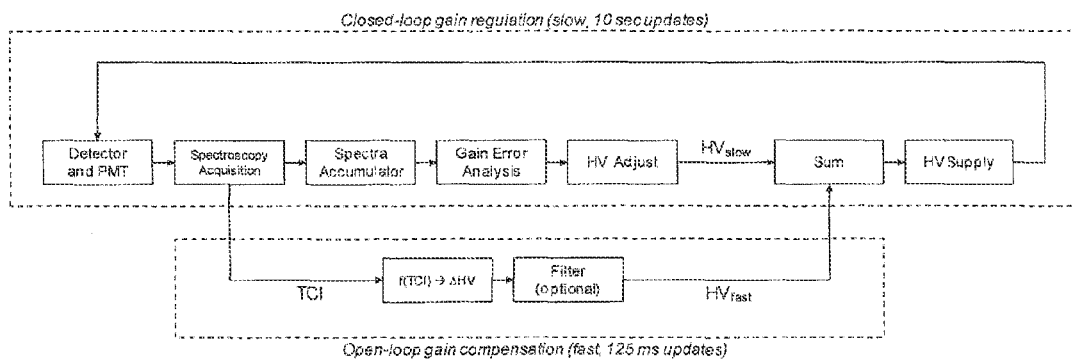
FIG. 4 shows a block diagram for an illustrative overall system gain regulation with a fast open-loop correction in parallel with a slow closed-loop correction.

In the present disclosure, overall system gain regulation is implemented by overlaying the slower closed-loop algorithm with the faster open-loop algorithm. The two methods are joined in parallel because they operate at different cycle times and to minimize cross-talk. The complete gain regulation system is shown in FIG. 4.

As can be seen, the slower closed-loop algorithm analyzes accumulated spectra to determine gain error and adjusts the HV setting to effect a correction. This entire process takes approximately 10 seconds in the present embodiment, with most of that time spent collecting sufficient spectral data to achieve a usable statistical uncertainty for the gain error calculations because the calculation uses a minimum number of total counts to be acquired. This closed-loop algorithm maintains long term stability and is the reference for gain accuracy.

The open-loop algorithm examines TCI every 125 ms and computes a new fast HV correction term. The fast term is added to the latest slow term and used to set the PMT HV. On the next 125 ms cycle, a new fast term is added to the slow term, and so on. Since the fast term is updated 80 times between each slow term update, it is the fast term that compensates for rapid changes in count rate and energy distribution (per TCI).

In one embodiment, the fast term is added to the slow term. Alternatively, the fast term can be computed as a percentage instead of a voltage, and then this percentage used to temporarily raise or lower the slow term by the fast percentage. This is a multiplicative approach, instead of additive. Since the fast term is small compared to the slow term, both additive and multiplicative methods are similar here. Situations with different PMT models or detector types may better utilize a multiplicative approach.

Another consideration is the timing of the fast term. The cycling rate can, of course, be adapted as desired. Or, a filter can be added to the fast term (pole or zero or more complex) to slow down or speed up application of the fast term. It was found in this approach that additional filtering was not needed, since the PMT HV supply included filtering in its response to setting changes which provided acceptable and reasonably matched response time behavior.

The slow closed-loop and fast open-loop algorithms can be tuned separately. This approach is preferred for the slow loop. The slow closed-loop algorithm can be tuned using methods that would be employed were a fast loop not present. The fast loop is preferably disabled during tuning of the slow loop.

The fast loop is preferably tuned by rapidly changing source output and noting the gain error of spectra in real-time (not just every 10 seconds). Only the slope $\Delta HV/\Delta(\ln_2(TCI))$ is tuned in this manner. Successful tuning occurs when no HV change was used from the slow loop and all real-time spectra showed no gain errors. If the latter occurs, then a fast-term filter may be helpful and its timing tuned to minimize gain error artifacts during count rate changes.

EXAMPLES

Two test wells were logged from bottom to top with the combined slow closed-loop and fast open-loop gain regulation method of the present disclosure. In each case the performance of gain regulation can be observed by monitoring the behavior of TCR, TCI, the fast HV term, the slow HV term, and gain error. Well #1 is a shallow well (70 ft) with a stack of short test formations with varying properties giving rapid changes in count rate over short vertical distances. Well #2 is a deeper well (3300 ft) with several rapid transitions separated by long distances of slowly varying formations. This well includes a sharp transition from open hole to casing which slightly changed count rate (curve SDTCR), but markedly changed energy distributions (curve SDTCI).

Throughout these wells, gain regulation held gain error (curve SDGRGAI) within a small band, deviating from nominal gain by +/−0.1%. Gain regulation slow (curve SDGRVZ) and fast (curve SDHVFD) terms were active throughout the log. On the longer run in well #2 the slow term can be seen compensating for what appears to be thermal drift (more rapid corrections as the detector first starts warming up, slower as it nears thermal equilibrium), as would be expected. Total count rate (SDTCR) varied over a range of 1.22:1 in Well #1 and 1.42:1 in Well #2.

The fast term (SDHVFD) is driven by TCI (SDTCI). If TCI goes up in a 125 ms cycle, the fast term is driven down to compensate at the start of the next 125 ms cycle. On both runs TCI and the fast term are active, especially when the environment around the detector is changing. The slow term is updated approximately every 10 seconds, two orders of magnitude slower than the fast term.

Figure 5:
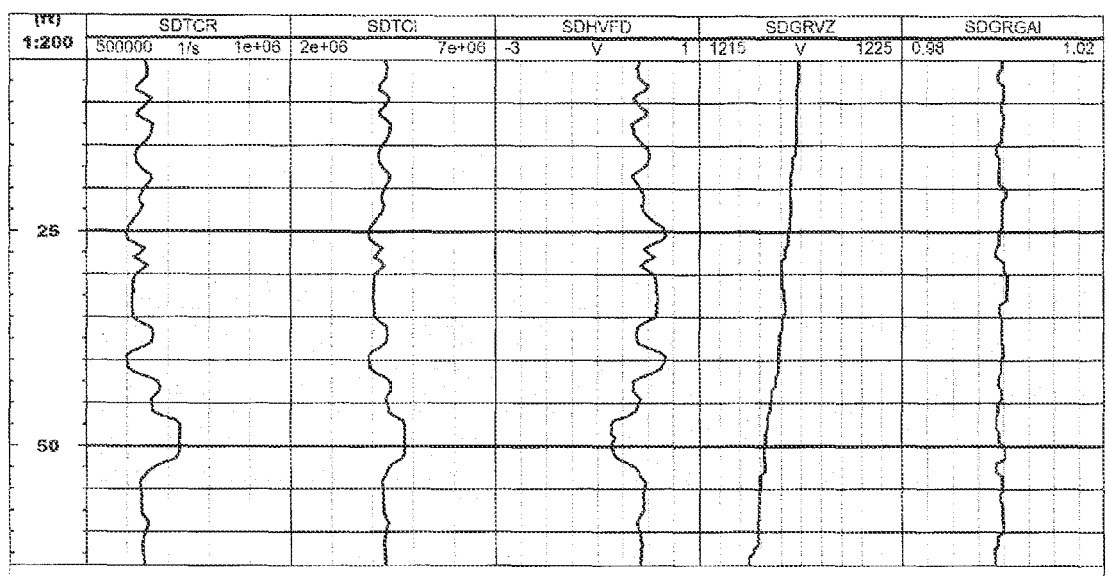
FIG. 5 shows a log of Example Well #1 (70 ft.) having a stack of short test formations with varying properties, resulting in rapid changes in count rate over short vertical distances. The log shows the performance of the gain regulation system in accordance with an embodiment of the present disclosure.

In Well #1 shown in FIG. 5, fast term activity is seen at numerous formation boundaries. The fast term spans a 1.2V range, which corresponds to 0.6% gain compensation, yet the log shows gain changes are contained within +/−0.1%, with standard deviation of 0.05%. This indicates that the fast term is successfully suppressing gain disturbances.

Figure 6:
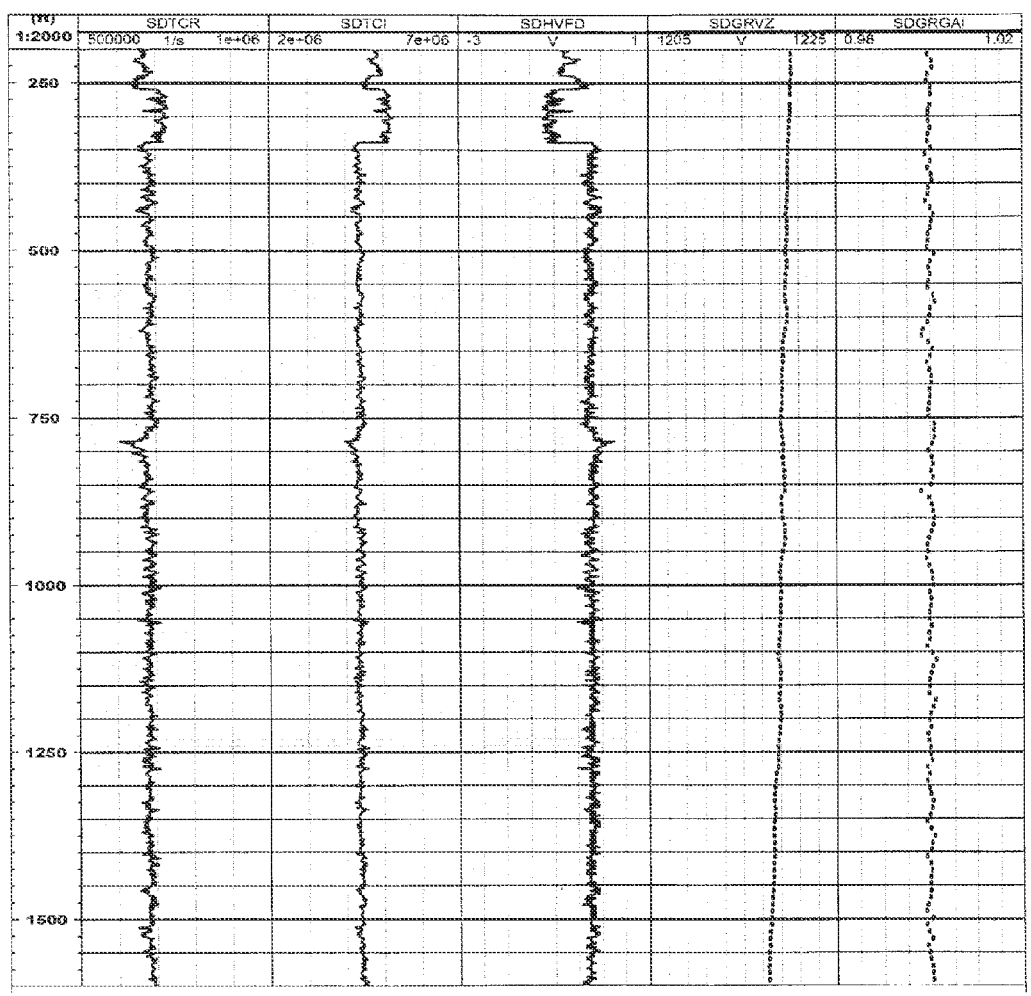
FIG. 6 shows a log of Example Well #2 (300 ft.) having several rapid transitions separated by long stretches of slowly varying formations, and a sharp transition from open borehole to cased borehole. The log shows the performance of the gain regulation system in accordance with an embodiment of the present disclosure.
Figure 7:
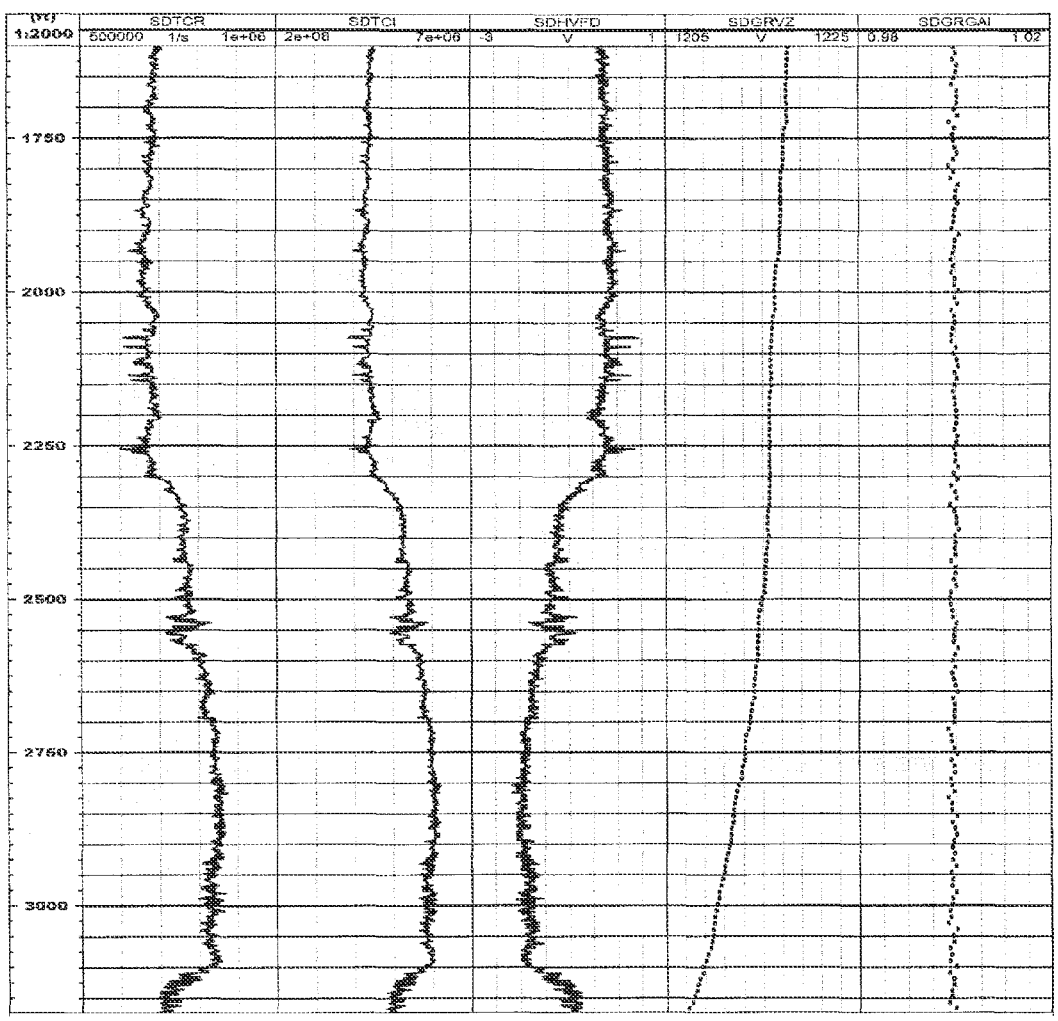
FIG. 7 a second log of Example Well #2 in a second area of evaluation. The log shows the performance of the gain regulation system in accordance with an embodiment of the present disclosure.

In Well #2 shown in FIG. 6 (top section) and FIG. 7 (bottom section), the fast term is particularly active when entering casing at 330 ft and when transitioning from brine to fresh water in the borehole between 2300 and 2400 ft. Smaller and sharper fast term activity is seen at various places in the well (e.g. near 2100 ft), assumed to be due to numerous causes—hole condition, source effects, and formation changes. The fast term spans a 2.5V range, which corresponds to 1.3% gain compensation, yet the log shows gain changes are contained within +/−0.1%, with standard deviation of 0.05%. This indicates that the fast term is successfully suppressing gain disturbances over the entire log.

Advantages may include:

Gain stability—the methods of this disclosure provide marked improvements in gain stability over the entire course of logging a well.

Improved resolution—Stable and accurate gain produces better overall resolution when stacking data over multiple time or depth intervals. The methods of this disclosure improve measurement performance and reduce costly post-processing remedial actions to attempt to fix gain errors. It also prevents measurement error due to spectral distortions, which may or may not be discovered.

Additional downhole resources not necessary—The open-loop technique is sufficiently simple and direct that implementation in a harsh and limited downhole environment may not use extraordinary resources in hardware, computing power, computing time, software development, and the like.

Uphole resources—The technique reduces real-time demands on the slower, often highly complex closed-loop gain regulation processing used for ultimate spectral accuracy. As such, larger and more complex processing may be located uphole (for wireline and wired drill-pipe applications) in a benign environment with higher computing power and more efficient software development. In applications without adequate surface communication (logging while drilling, logging while tripping, slick line, etc), less performant downhole resources can be used for the slower closed-loop processing and the cycle time extended, saving on hardware development and power.

Simplified calibration—The technique allows for simple calibration, which may be adequate for the life of a spectroscopy acquisition system, and may be adequate for all units in a given model design. If helpful, it is possible to dynamically calibrate by observing correlation between TCI and gain error, and adjusting the calibration to minimize this correlation.

Simplicity—Though lengthy text is presented here to describe the system, the concept can be implemented in a straight-forward manner. The overlay of two control loops, one fast and the other slow, lends itself to simple design, testing, and tuning.

Robust—The open-loop, empirical approach can be reliably implemented with minimal cross-talk between loops and with minimal concern for loop instability. This is due to the large difference in update rates and to the very low coupling between gain and TCI, placing the open-loop very far from instability conditions.

One can extend or modify the techniques discussed herein to achieve open-loop gain regulation for similar spectroscopy systems. A key step in development of such systems is to identify the stimuli, or system performance indicators, that cause or correlate to gain changes in the system. These include, but are not limited to Total count rate, Peak count rate, Total integrated charge, Anode current, Dynode current, Bias supply loading (e.g. output current), System Live-time, System Dead-time, Pile-up rate, and analogs of the above.

Some gamma-ray systems are used for counting, not for spectroscopy. Such systems could be considered a single bin spectrum, and can also benefit from this approach to stabilize the gain and/or pulse-height discriminator setting as a function of TCI or similar stimuli. This can improve accuracy over a wide range of count rates.

As shown here, the open-loop output is added to the closed-loop output. Alternatively, the correction signal from the open-loop gain regulation may be applied as a fractional increase to the closed-loop signal, i.e. in a multiplicative manner.

The methods described here can be readily extended to provide fast compensation for other spectroscopy effects such as offset or linearity. Signals such as those listed above can be evaluated for suitability to drive an open-loop control system, appropriate transforms derived, and a fast term correction signal produced.

Gain adjustment can be affected by means other than bias supply adjustment. Means can include, but are not limited to, variable gain amplifiers, digital gain adjustment, re-binning of spectra, and so on. Note that discrete approaches such as re-binning or digital gain adjustment may introduce distortion artifacts into the gain-adjusted spectrum. Analog adjustment techniques are preferred.

While the disclosure is described in the context of using a scintillation detector coupled to a photomultiplier, it would apply equally to a scintillation detector coupled to another photon-electron converter like a silicon photomultiplier or another light sensitive detection and/or amplification device. Possible scintillation materials to be used with this disclosure are NaI(Tl) (Thallium-doped sodium iodide), CsI(Na) or CsI(Tl) (sodium or thallium doped cesium iodide), BGO (Bismuth Germanate), GSO:Ce (Ce-doped Gadolinium Oxy-Ortho-Silicate), LPS:Ce (Ce-doped Lutetium-pyrosilicate), LaBr3:Ce, LaCl3:Ce, LuAP:Ce, LuAG:Pr, YAP:Ce, YAP:Pr, SrI2:Eu and many more. The disclosure can also be applied to systems based on detectors which directly produce an electrical signal, without need of an additional photon detector.

While the disclosure has been explained with respect to a limited number of embodiments, those skilled in the art, having the benefit of this disclosure, will appreciate numerous modifications and variations therefrom. It is intended that the appended claims cover such modifications and variations as fall within the true spirit and scope of the disclosure.

What is claimed is:
1. A method for fast gain regulation, comprising:
applying a voltage to a detector of a spectrum acquisition tool;
acquiring an energy spectrum with the spectrum acquisition tool;
during a first time period, detecting one or more system performance indicators and adjusting the voltage by a first amount relating to the one or more system performance indicators;
during a second time period, detecting a gain error based on the energy spectrum acquired and adjusting the voltage by a second amount relating to the gain error;

wherein the first time period is shorter than the second time period, and the second time period comprises the time to acquire the energy spectrum.

2. The method of claim 1, further comprising:

computing a second gain correction term based on one or more measured spectral features;

combining the second gain correction term with the first gain correction term; and changing the device gain based on the combination.

3. The method of claim 2, further comprising computing the first gain correction term concurrently at a first rate while computing the second gain correction term at a slower second rate.

4. The method of claim 2, wherein the one or more system performance indicators comprise one selected from the group consisting of total count rate at the detector, peak count rate at the detector, average detector current, and peak detector current.

5. The method of claim 2, wherein the combination comprises the first gain correction term added to the second gain correction term to result in an amount by which the device gain is adjusted.

6. The method of claim 2, wherein the combination comprises the second gain correction term is mathematically manipulated by the first gain correction term to result in an amount by which the device gain is adjusted.

7. The method of claim 2, further comprising changing the device gain by redistributing the signals indicative of energy arriving at the detector digitally into a plurality of bins of a spectral histogram.

8. The method of claim 2, further comprising changing the device gain by increasing or decreasing a high voltage applied at a photomultiplier of the detector.

9. The system of claim 2, further comprising changing the device gain by changing a gain of an amplifying device amplifying the output signal of the detector.

10. The method of claim 2, wherein the system performance indicator comprises an average photomultiplier current in a sampling interval.

11. The method of claim 2, wherein the system performance indicator comprises an average count rate of the detector over a sampling interval.

12. The method of claim 2, wherein the system performance indicator comprises an average count rate multiplied by the average observed deposited energy.

13. The method of claim 2, wherein the detector is adapted for use in a downhole gamma-ray spectroscopy logging tool.

14. The method of claim 2, wherein the system performance indicator comprises a peak current in the PMT or a peak count rate in the PMT.

15. The method of claim 2, further comprising pre-determining a relationship between the first gain correction term and a given one of the one or more system performance indicators.

* * * * *